United States Patent [19]
Krahn

[11] Patent Number: 5,589,769
[45] Date of Patent: Dec. 31, 1996

[54] POSITION DETECTION APPARATUS INCLUDING A CIRCUIT FOR RECEIVING A PLURALITY OF OUTPUT SIGNAL VALUES AND FITTING THE OUTPUT SIGNAL VALUES TO A CURVE

[75] Inventor: Donald R. Krahn, Eagan, Minn.

[73] Assignee: Honeywell Inc., Minneapolis, Minn.

[21] Appl. No.: 324,182

[22] Filed: Sep. 30, 1994

[51] Int. Cl.⁶ .............................. G01B 7/02; G01D 5/16; G01D 5/246
[52] U.S. Cl. ................. 324/207.26; 324/207.21; 324/207.24
[58] Field of Search .......... 324/207.11–207.26, 324/173, 174, 166, 251, 252; 137/553, 554, 556; 364/449, 560, 571.01; 318/653, 661

[56] References Cited

U.S. PATENT DOCUMENTS

| | | |
|---|---|---|
| 4,591,784 | 5/1986 | Kolitsch et al. .................. 324/207.25 |
| 4,652,821 | 3/1987 | Kreft .................. 324/207.23 |
| 4,698,996 | 10/1987 | Kreft et al. .................. 324/202 |
| 4,879,511 | 11/1989 | Leon .................. 324/207.24 |
| 5,216,363 | 6/1993 | Masaaki .................. 324/207.24 |
| 5,239,474 | 8/1993 | Eaton, Jr. et al. .................. 324/207.26 |
| 5,270,645 | 12/1993 | Wheeler et al. .................. 324/207.12 |
| 5,351,028 | 9/1994 | Krahn .................. 324/207.21 X |
| 5,390,109 | 2/1995 | Takemoto et al. .................. 324/207.11 X |

FOREIGN PATENT DOCUMENTS

| | | |
|---|---|---|
| 427882 | 5/1991 | European Pat. Off. . |
| 3443176 | 11/1990 | Germany . |
| 2131554 | 6/1984 | United Kingdom . |

*Primary Examiner*—Sandra L. O'Shea
*Assistant Examiner*—Roger C. Phillips
*Attorney, Agent, or Firm*—Gregory A. Bruns

[57] ABSTRACT

A member having a magnet attached is moveable along a path which has an array of magnetic field sensors adjacent the path. Each sensor provides a bipolar output signal as the magnet passes. A plurality of sensors provide a plurality of output signals for a first position of the magnet. Electronic means fit the plurality of output signals to a first curve having a crossover point to determine the first position.

15 Claims, 3 Drawing Sheets

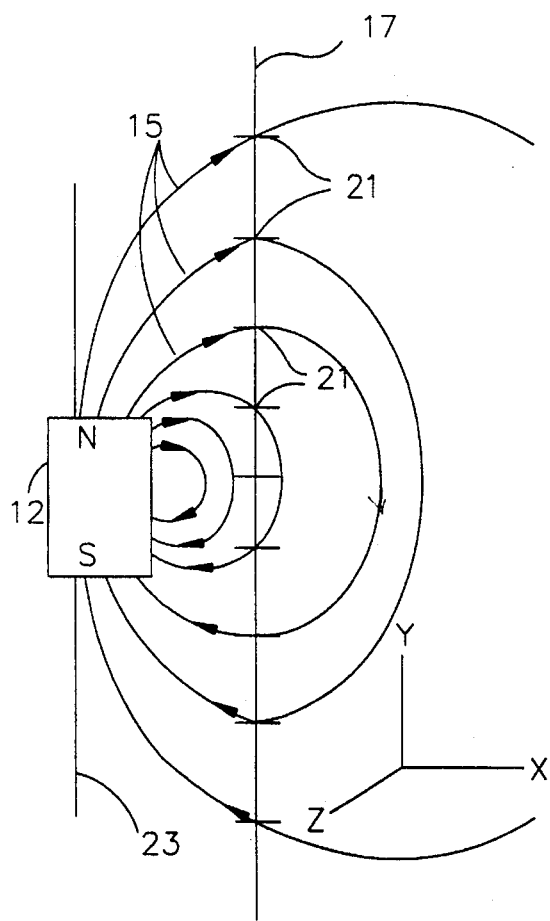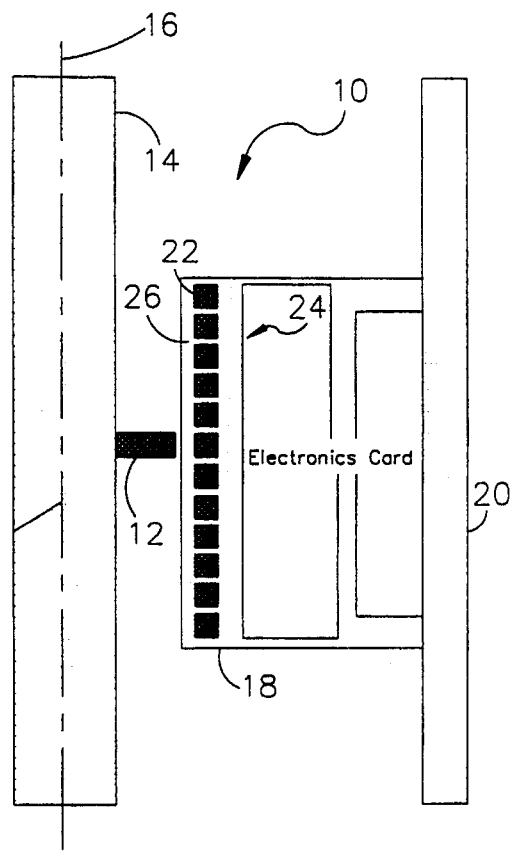
Fig. 1a                    Fig. 1

POSITION DETECTION APPARATUS INCLUDING A CIRCUIT FOR RECEIVING A PLURALITY OF OUTPUT SIGNAL VALUES AND FITTING THE OUTPUT SIGNAL VALUES TO A CURVE

BACKGROUND OF THE INVENTION

The present invention relates generally to position detection apparatus and particularly to apparatus for determining the position of a member that is movable along a defined path of finite length.

It is a common problem to want to know the position of a device whose position is being controlled by an actuator or some other means. For example, in the controls industry, devices such as valves having a valve stem or valve shaft which is movable by an actuator are used to control the flow of liquids and gasses associated with industrial processes of various types. In these applications it is common to want to know, at any given time, the precise position of the movable valve stem or valve shaft. This information allows improved understanding of the process and the control of the process.

A number of prior solutions have been proposed. Optical coding schemes make use of a coded element with opaque and transparent sections to provide digital data inputs to an array of sensors positioned to measure the light passing through the sections. While optical coding devices do not require a mechanical linkage, the optical approach only works well in very clean environments and is therefore not applied in many industrial environments.

Linear variable differential transformers (lvdt) can provide very accurate position information. However they require a mechanical linkage and also generally use relatively high power.

Potentiometers or other rotary transducers require a mechanical linkage and also have the disadvantage of a sliding electrical contact which can cause long term reliability issues.

Hall effect transducers, as they are currently used, generally require a mechanical linkage.

Thus a need exists for a reliable position determining apparatus that does not require a mechanical linkage between the apparatus and the movable member, and is relatively insensitive to environmental factors.

SUMMARY OF THE INVENTION

The present invention solves these and other needs by providing an apparatus for determining a position of a member movable along a path. A magnet is attached to the movable member and an array of magnetic field transducers are located adjacent the path. As the magnet approaches, passes and moves away from a transducer, the transducer provides a varying output signal which can be represented by a single characteristic curve that is representative of any of the transducers. To determine the position of the movable member, the transducers are electronically scanned and data is selected from a group of transducers having an output that indicates relative proximity to the magnet. A curve fitting algorithm is then used to determine a best fit of the data to the characteristic curve. By placement of the characteristic curve along a position axis, the position of the magnet and therefore the movable member may be determined.

BRIEF DESCRIPTION OF THE DRAWINGS

FIG. 1 shows a side view of the present invention along with a portion of a valve stem and a valve yoke.

FIG. 1a shows an enlarged view of a portion of FIG. 1.

DETAILED DESCRIPTION

Figure 2:
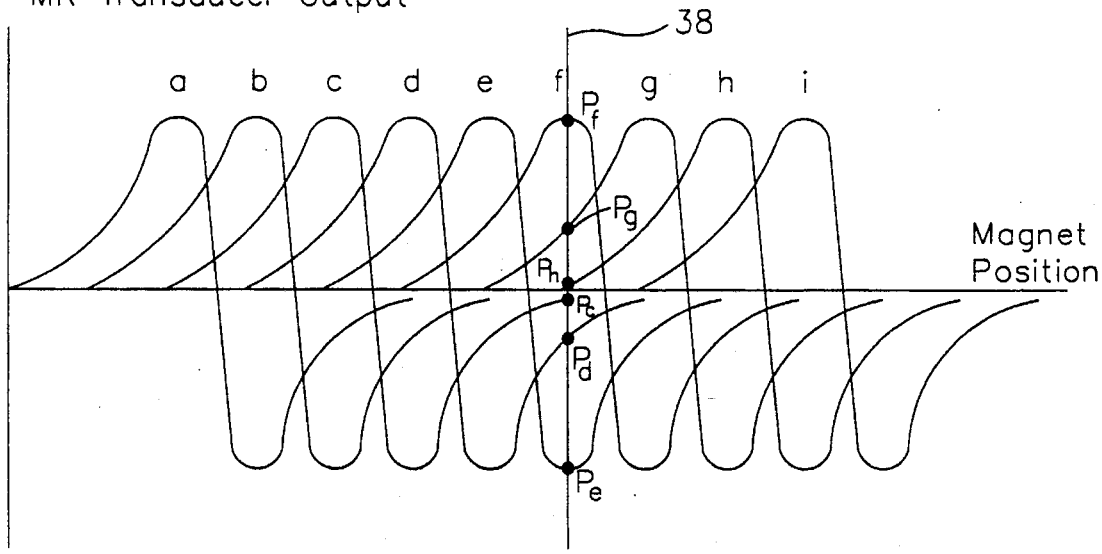
FIG. 2 shows a number of curves representing the output signals from the transducers of FIG. 1.

An apparatus for detecting the position of a movable member such as a valve stem is shown in the drawings and generally designated 10. Apparatus 10 as shown in FIG. 1 includes a magnet 12 which is attached to valve stem 14 which is in turn attached to other movable valve parts (not shown) that vary the flow through the valve. Valve stem 14 is movable along its longitudinal axis 16.

Apparatus 10 also includes a sensor module or electronics module 18 which is to be mounted to valve yoke 20 or another suitable fixed support located beside valve stem 14. Sensor module 18 includes magnetic field transducers 22 arranged in a linear array 24 parallel to longitudinal axis 16 with transducers 22 spaced a known distance 26 apart. Magnet 12 moves as valve stem 14 moves and the magnetic field from magnet 12 also moves along array 24. Magnet 12 provides a magnetic field that can be represented by components along three mutually perpendicular axis. Transducers 22 may be designed to be sensitive to a magnetic field component in a single direction, e.g., along the x-axis or to be sensitive to magnetic field components in a combination of directions. Each transducer 22 obtains magnetic field data when magnet 12 is in proximity to it.

FIG 1a shows an enlarged view of magnet 12 a its magnetic flux lines 15. Transducers 22 would be located along line 17, for example, at location 21. Magnet 12 would move along line or path 23. Transducers 22 may be designed to be sensitive to a magnetic field component in a particular direction, for example, along the x, y or z axis of FIG. 1a. One example is a Hall sensor arranged to be sensitive along the x-axis. Alternatively, transducers 22 may be designed to be sensitive to a combination of components. One example is a transducer of magnetoresistive material, e.g., permalloy strips connected in a bridge arrangement, lying in the x-y plane and operating in a field strong enough to saturate the permalloy strips. Under these conditions the resistance change of the permalloy strips is a measure of the angle of the magnetization in the x-y plane and therefore a measure of the angle of the magnetic field.

FIG. 2 shows magnetic field data representative of the output of each transducer 22 for an array of 9 (nine) transducers as a function of the position of a dipole magnet 12. A varying output signal is provided by each transducer 22 as magnet 12 approaches, passes and moves away from it. The output signals are designated a through i. Vertical line 38 represents the position of magnet 12 and points $P_c$, $P_d$, $P_e$, $P_f$, $P_g$ and $P_h$ represent output voltages obtained from signals c, d, e, f, g and h respectively at location 38.

Figure 3:
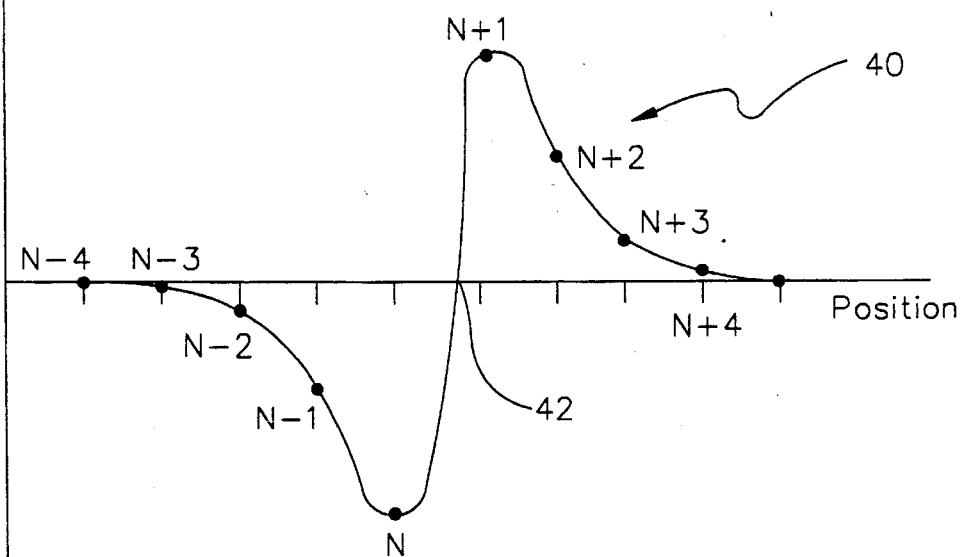
FIG. 3 shows certain output signals from FIG. 2 fitted to a known curve shape.

FIG. 3 shows outputs of transducers 22 for a position of magnet 12 at the location of vertical line 38 of FIG. 2. The outputs are fitted to a known or characteristic curve shape and from the fit, the position of magnet 12 is obtained from crossover 42 of curve 40 on the position axis.

Figure 4:
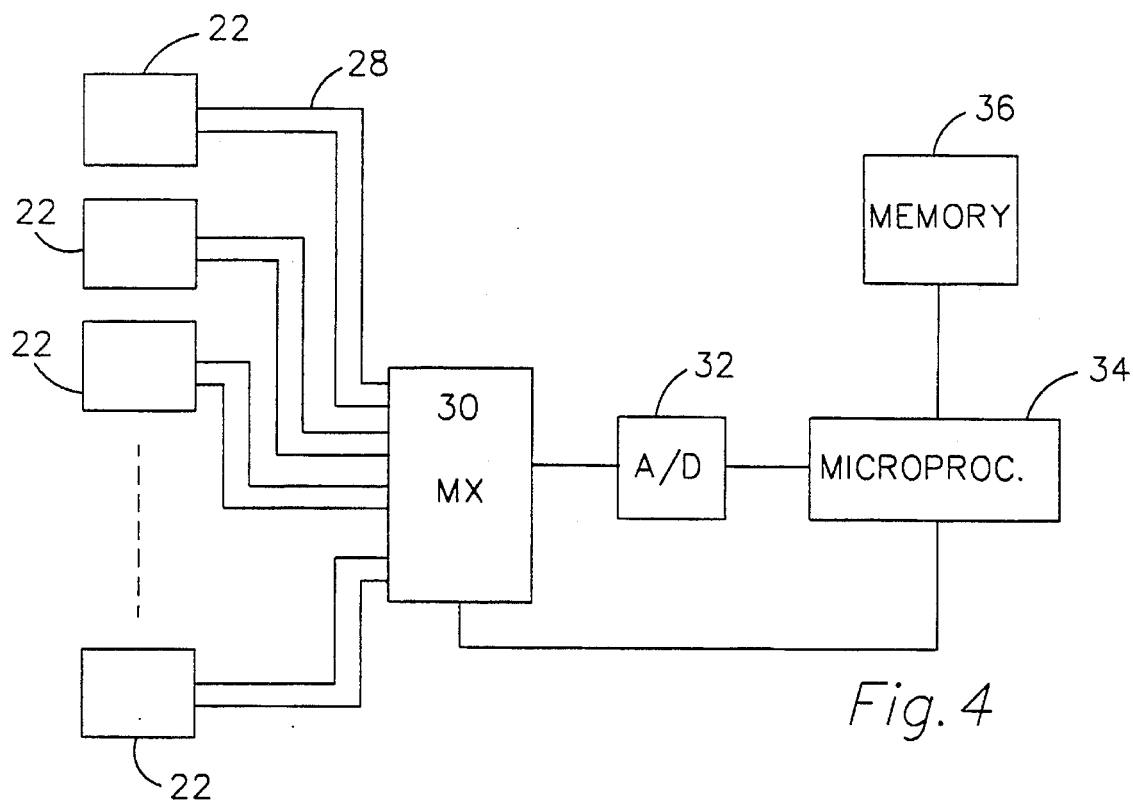
FIG. 4 shows in block diagram form the invention of FIG. 1.

As shown in FIG. 4, transducers 22 are connected to sensor module 18 by conductors 28. Magnetic field data from transducers 22 may be obtained in series or in parallel. To minimize power consumption, transducers 22 may be wired to multiplexer 30 to obtain data serially as shown. FIG. 4 also shows analog to digital converter (A/D) 32 microprocessor 34 and its associated memory 36. Microprocessor 34 controls multiplexer 30 to determine which transducer 22 is connected to multiplexer 30. To obtain data in a shorter time, transducers 22 may be connected to individual A/D converters which are in turn individually connected to a microprocessor.

Microprocessor 34 is a low-power and low performance processor suitably programmed to use an algorithm to compare measured output signals $P_c$ through $P_h$ to a known shape of curve 40 of FIG. 3. An algorithm can be embedded in microprocessor 34 for this purpose. Microprocessor 34 would be suitably programmed to provide functions that include the following: periodically scan the outputs of each transducer to obtain data; select a group of transducers located adjacent one another with each transducer in the group having an output greater than a threshold value; fit the data from the selected group of transducers to a known curve shape stored in the microprocessor using a best fit algorithm; and, based on the best fit, provide the zero output point or crossover point of the curve with the position axis.

Figure 5:
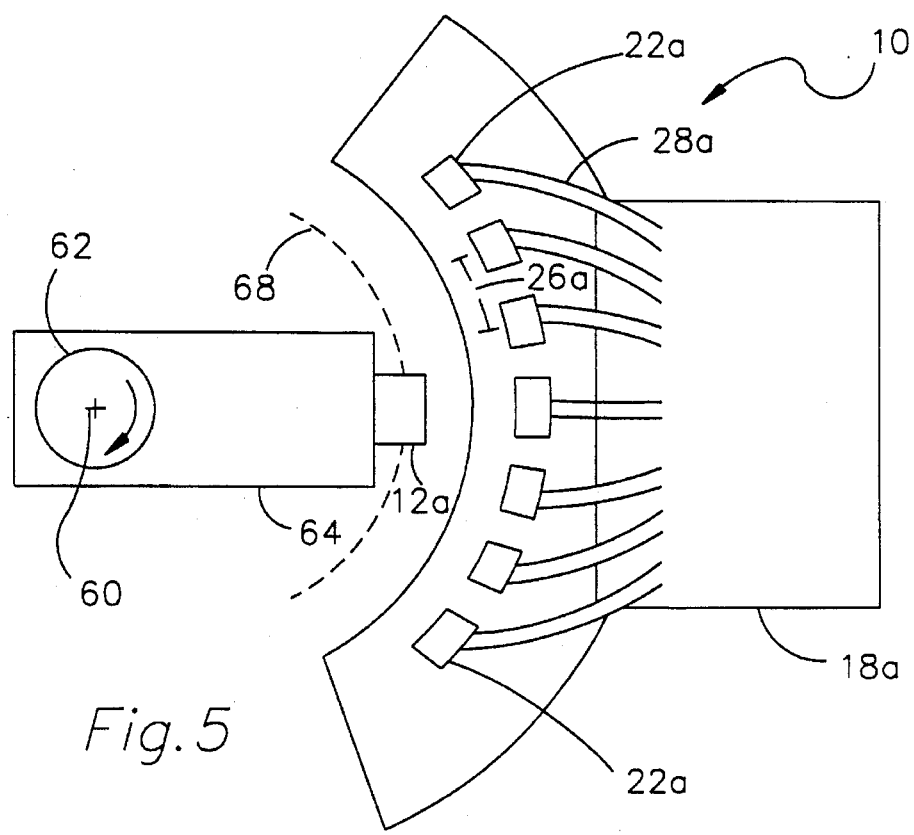
FIG. 5 shows the present invention along with a portion of a rotating valve shaft and an attached arm.

FIG. 6 shows an arrangement of apparatus 10 for use with a device wherein the required movement is in a curved path. One example of this type of application is a valve designed for control by rotational movement about an axis 60 of a shaft 62. A crank arm 64 is secured to shaft 62 and movement of end 66 of crankarm 64 will control flow through the valve. Transducers 22a are connected to electronics module 18a which is maintained to a fixed support. In this arrangement magnetoresistive transducers 22a are placed in a curved path representing a portion of a circular path about shaft 62. In other respects the operation of apparatus 10 illustrated in FIG. 5 is similar to the arrangement of FIG. 1.

Now that the basic operation of apparatus 10 has been set forth, certain advantages may be described and appreciated. The present invention does not require a mechanical linkage from the valve stem for linear motion applications or from the valve shaft for rotational applications. Because there is no mechanical contact, apparatus 10 will not be subject to friction or wear considerations and will not impede the normal operating characteristics of the valve or other device with which it is used. In addition, the present invention has inherent insensitivity to environmental conditions, e.g., water, ice, temperature extremes, dust or chemicals, will not affect its operation.

I claim:

1. Apparatus for determining a position of a member movable along a defined path, comprising:

means for producing a magnetic field attached to said member;

an array of magnetic field transducers located adjacent said defined path, each transducer comprising magnetoresistive material and providing a bipolar output signal as said means for producing a magnetic field approaches, passes and moves away from said each transducer, with said magnetic field of sufficient strength to saturate said magnetoresistive material;

said array of transducers providing a plurality of output signal values for a first position of said means for producing a magnetic field; and electronic means for receiving said plurality of output signal values and fitting said plurality of output signal values to a first curve and using a crossover point of said first curve to determine said first position.

2. Apparatus of claim 1 wherein said electronic means comprises:

memory means for storing said first curve; and processor means for receiving said plurality of output signal values, comparing said plurality of output signal values to said first curve, and fitting said plurality of output signal values to said first curve to determine said first position.

3. Apparatus of claim 2 wherein said plurality of output signals are analog signals and said electronic means further comprises:

multiplexing means for receiving said plurality of signals in parallel format and providing said plurality of signals in serial format; and conversion means for converting said plurality of analog signals to a plurality of digital signals.

4. Apparatus of claim 1 wherein said means for producing a magnetic field is a dipole magnet.

5. Apparatus of claim 4 wherein each said transducer is sensitive to a magnetic field component in a first direction and said first direction is parallel to a direction of movement of said magnet.

6. Apparatus of claim 5 wherein each said transducer is sensitive to a magnetic field component in a second direction and said second direction is perpendicular to a direction of movement of said magnet.

7. Apparatus of claim 1 wherein said member is a valve stem having a longitudinal axis, said valve stem movable along said longitudinal axis.

8. Apparatus of claim 1 wherein said member is an arm secured to a valve shaft having a rotational axis, said arm movable about said rotational axis.

9. Apparatus for determining a position of a movable member of a valve, said movable member controlled by an actuator and movable along a path, said apparatus comprising:

a magnet attached to said movable member for producing a magnetic field, said magnetic field having components lying along an x axis, a y axis and a z axis, said x axis, said y axis and said z axis being mutually perpendicular;

an array of magnetic field transducers located adjacent said path, each said transducer comprising magnetoresistive material and being sensitive to magnetic field components lying along at least one of said x-axis, said y-axis or said z-axis, each transducer providing a bipolar output signal as said magnet moves toward, passes and moves away from said each transducer, with said magnetic field being of sufficient strength to magnetically saturate said magnetoresistive material;

said array of transducers providing a plurality of output signal values for a first position of said magnet; and electronic means for receiving said plurality of output signal values and fitting said plurality of output signal values to a first curve and using a crossover to determine said position.

10. Apparatus of claim 9 wherein said electronic means comprises:

memory means for storing said known curve;

processor means for receiving said plurality of output signals, comparing said plurality of output signals to said known curve, and fitting said plurality of output signals to said known curve to determine said position.

11. Apparatus of claim 10 wherein said plurality of output signals are analog signals and said electronic means further comprises:

multiplexing means for receiving said plurality of signals in parallel format and providing said plurality of signals in serial format; and conversion means for converting said plurality of analog signals to a plurality of digital signals.

12. Apparatus of claim 9 wherein each said transducer is sensitive to a magnetic field component in a first direction and said first direction is parallel to a direction of movement of said magnet.

13. Apparatus for determining a position of a member movable along a defined path, comprising:

a dipole magnet attached to said member;

an array of magnetic field transducers comprising magnetoresistive material located adjacent said defined path, each transducer providing a bipolar output signal as said magnet moves toward, passes and moves away from said each transducer, with said magnet providing a sufficient magnetic field to cause said magnetoresistive material to be magnetically saturated;

said array of transducers providing a plurality of output signal values for a first position of said magnet; and electronic means for receiving said plurality of output signal values and fitting said plurality of output signal values to a first curve and using a crossover point of said first curve to determine said first position.

14. Apparatus of claim 13 wherein each said transducer is sensitive to a magnetic field component in a first direction and said first direction is parallel to a direction of movement of said magnet.

15. A method for determining a position of a member movable along a defined path, comprising the following steps:

providing a means for producing a magnetic field attached to said member;

providing an array of magnetoresistive magnetic field transducers adjacent said defined path;

determining a characteristic curve for a magnetoresistive magnetic field transducer as said magnet approaches, passes and moves away from said transducer with said transducer being magnetically saturated;

determining a plurality of output values from a plurality of transducers for a first position of said means for producing a magnetic field; and fitting said plurality of output values to said characteristic curve to determine said first position.

* * * * *